United States Patent Office 3,378,526
Patented Apr. 16, 1968

3,378,526
PROCESS OF PRODUCING FLAME-RESISTANT MOLDED ARTICLES FROM EPOXY RESINS
Wilhelm Vogt, Cologne-Sulz, Paul Janssen, Cologne, and Hermann Richtzenhain, Cologne-Sulz, Germany, assignors to Dynamit Nobel Aktiengesellschaft, Troisdorf, Bezirk Cologne, Germany, a corporation of Germany
No Drawing. Filed Nov. 23, 1965, Ser. No. 509,433
Claims priority, application Germany, Nov. 24, 1964,
D 45,906
21 Claims. (Cl. 260—47)

This invention relates to the hardening of epoxy resins. It more particularly relates to hardened epoxy resins which are substantially flame-resistant.

The manufacture of epoxy resin compounds having flame-resistant properties is in the prior art. Flame-resistance is the technically valuable ability of a synthetic resin which has been ignited by a flame to extinguish itself promptly instead of continuing to burn indefinitely and constantly. Flame-resistant properties can be achieved, for example, by the use of hardeners containing chlorine or bromine, such as dichloromaleic acid anhydride or tetrachlorophthalic acid anhydride. The use of epoxy resins containing chlorine or bromine, such as the diglycidyl ether of tetrachloro or tetrabromo diphenylolpropane, also results in products with flame-resistant properties. Another possibility consists in the use of additives which contain chlorine, bromine and/or phosphorous, such as triphenyl phosphite or tri-β-chloroethyl phosphate. Flame-resistant compounds on a basis of components containing chlorine or bromine require a relatively high chlorine or bromine content. This high halogene content, however, frequently results in considerable technical disadvantages. For example, an epoxy resin made from tetrachloro or tetrabromo diphenylolpropane and epichlorhydrin has a high viscosity and is therefore substantially more difficult to work with than the corresponding resin made of halogen-free diphenylolpropane. Another possibility for the manufacture of flame-resistant compounds is the use of epoxy resins containing phosphorous and made, for example, by the reaction of epoxies containing hydroxyl groups with the halides of phosphoric, phosphonic, or phosphinic acids, or by the reaction of epi-halohydrines with dialkylphosphites. Another known method is the use of phosphoric acid, phosphoric acid esters, tertiary phosphites and phosphonic acids as hardeners for epoxy resins. The mechanical characteristics of the compounds obtained with these hardeners do not, however, meet the necessary requirements, especially on account of their great brittleness.

In co-pending application Ser. No. 472,311 there is disclosed a method for preparing flame-resistant epoxy resin materials and of hardened products therefrom. These products are the reaction products of various known or common epoxy resins and aromatic phosphorins. As set forth in said parent application, the aromatic phosphorins are exemplified by the reaction products of trivalent and polyvalent phosphorous compounds and aromatic hydroxy carboxylic acids. These reaction products are mixed ester anhydrides. These mixed ester anhydrides contain the group

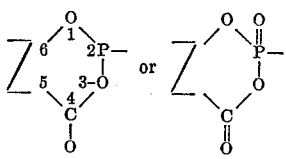

wherein the Z's are aryl radicals having among their ring carbon atoms the 5 and 6 position carbon atoms of the phosphorous-containing rings.

Compounds of this kind can be for example described by the following general formulas, for example:

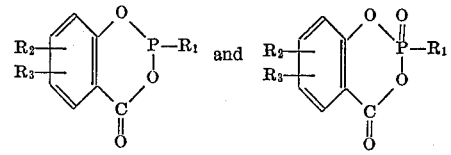

wherein $R_1$ may be chlorine or bromine, $R_2$ and $R_3$ may be each hydrogene, alkyl, alkoxy halogene or a condensed ring.

These compounds can be obtained by known processes, as for example by the transposition of aromatic o-hydroxycarboxylic acids (which may be further substituted if desired) with phosphorus trichloride, dichlorophosphorous acid esters, dichlorophosphoric acid esters, and dichlorophosphinic and dichlorophosphonic acids.

Of the aromatic o-hydroxycarboxlic acid, salicylic acid is especially suitable, as well as its substitution products, such as the monochloro or dichloro or monobromo or dibromo salicylic acids, and the o-hydroxynaphthalene carboxylic acids corresponding thereto.

By the reaction of these acid components and the previously described phosphorus compounds, the following compounds, for example, are obtained: 2-chloro-4-oxo-5,6-benzo-1,3,2-dioxaphosphorin, 2 - bromo - 4 - oxo-5,6-benzo-1,3,2-dioxaphosphorin, 2,4 - dioxo - 2 - chloro-5,6-benzo-1,3,2-dioxaphosphorin, 2,4 - dioxo - 2 - bromo-5,6-benzo-1,3,2-dioxaphosphorin.

It is an object of this invention to produce molded articles and coatings by hardening flame-resistant epoxy resins.

It is another object of this invention to prepare flame-resistant epoxy resins containing phosphorus constituents as the flame retardants.

It is a further object of this invention to prepare flame-retardant epoxy resins in a novel manner.

Other and additional objects of this invention will appear from a consideration of the whole of this specification and the claims appended hereto.

In accord with, and fulfilling these objects, one facet of this invention resides in the reaction of a phosphorin of the formula

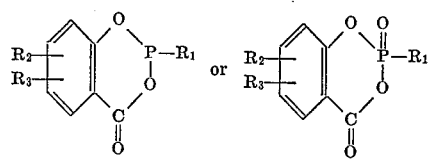

R, $R_2$ and $R_3$ having the previously described meaning, with a polyepoxide-containing aliphatic, cycloaliphatic or aromatic compound under such conditions, including a temperature of about 0 up to 80° C. that soluble β-halogenated aliphatic, cycloaliphatic or aromatic phosphoric or phosphorus acid esters result and, thereafter, in a second stage hardening the resin formed to produce molded articles and coatings by increasing the temperature to above 80° C. and preferably to a temperature within the range of about 80–200° C., most preferably 100–150° C.

The hardening of these reaction products to produce molded articles and coatings in the second stage of the process can take place at temperatures above 80° C. without any further addition of hardener, or possibly in the presence of hardening accelerators, by the reaction of the cyclic anhydride group with the epoxy groups present. However, hardening may also be carried out, in order to obtain particular mechanical properties, by the addition of other common hardening agents, such as carbonic acid anhydrides or polyols, or hardening accelerators, especially in the case of an excess of epoxy groups, in a temperature range of 80–150° C.

Thus, for example, in accordance with the invention, a polyepoxide such as a diglycidyl ether of 2,2-bis-(4-hydroxy-phenyl)-propane is reacted in a first stage with 2-chloro-4-oxo-5,6-benzo-1,3,2-dioxaphosphorin to produce a soluble product. In the reaction, the phosphorus acid halide enters into reaction with an epoxy group of the polyepoxide, by ring opening of an expoxy ring to form a betachloroalkylphosphorous acid group by sustaining the cyclic mixed anhydride structure. Thus, in the instant illustration, one mole of a bifunctional epoxy compound like the diglycidyl ether of 2,2-bis-(4-hydroxyphenyl)-propane is reacted with one mol of 2-chloro-4-oxo-5,6-benzo-1,3,2-dioxaphosphorin to form a compound which contains not only a hardenable epoxy group but also an anhydride group as a hardening group. The molar ratio of the reaction can also be chosen, however, in such a manner that the epoxy groups, with respect to the anhydride groups, are present either in slight or great excess. The phosphorus-containing mixed ester anhydride of an aromatic ortho-hydroxy carboxylic acid may be used in a molar ratio to the epoxy compound of 1 to greater than 1, preferably 1 to 2. The given molar ratio is applied in the case of a diepoxide compound. Epoxide compounds with more than two epoxy groups are used in such an amount, that the relation of the epoxy group to the phosphorus-containing compound is the same, that means, more than two epoxy groups per mixed ester anhydride are used. By blending previously formed epoxy anhydride adducts with polyepoxides, similar results may be obtained. The reaction gives hardenable products which are soluble in organic solvents and have a stable viscosity. Thereafter, in a second stage, the reaction product is hardened at a temperature above 80° C. possibly under addition of a known epoxy resin, carbonic acid anhydride or polyol hardener or known hardening accelerator.

While the above is given as illustrative of the reaction and the reaction product, according to the invention it will be apparent that the same reaction will take place if the diglycidyl ether of 2,2-bis-(4-hydroxyphenyl)-propane is replaced by another epoxy compound containing two or more epoxy groups in the molecule.

Particularly suitable are the polyepoxies of polyunsaturated hydrocarbons (vinylcyclohexene, dicyclopentadiene, cyclohexadiene, cyclododecatriene, butadiene, polybutadiene, divinylbenzenes), oligomers of epichlorhydrin and the like, epoxy ethers of polyvalent alcohols (ethylene glycols, propylene glycols and butylene glycols, polyglycols, thiodiglycols, glycerine, pentaerythritol, sorbitol, polyvinyl alcohol, polyallyl alcohol, etc.), epoxy ethers of polyvalent phenols (resorcinol, hydroquinone, bis-(4-oxyphenyl)-methane, bis-(4-oxy - 3-methylphenyl)-methane, bis-(4-oxy-3,5-dichlorophenyl)methane, bis-(4-oxy-3,5-dibromophenyl)-methane, bis-(4-oxy-3,5 - difluorophenyl)-methane, 1,1-bis-(4-oxyphenyl) - ethane, 2,2-bis-(4-oxyphenyl)-propane, 2,2-bis-(4-oxy-3-methylphenyl) - propane, 2,2-bis-(4-oxy-5-chlorophenyl)-propane, 2,2-bis-(4-oxy-3,5-dichlorophenyl) - propane, bis - (4-oxyphenyl)-phenylmethane, bis-(4-oxyphenyl)-diphenylmethane, bis-4-oxyphenyl)-4' - methylphenylmethane, 1,1-bis-(4-oxyphenyl)-2,2,2-trichloroethane, bis-(4-oxyphenyl)-4-(chlorophenyl)-methane, 1,1-bis-(4-oxyphenyl)-cyclohexane, bis-(4-oxyphenyl)-cyclohexylmethane, 4,4'-diovydiphenyl, 2,2'-dioxydiphenyl, 4,4'-dioxydiphenylsulfone and the oxyethylethers and phenolformaldehyde condensation products thereof), and also polyepoxy compounds which have been made by prior art methods from poly-unsaturated carboxylic acids or monounsaturated carboxylic acid esters of unsaturated alcohols, glycidyl esters of polybasic carboxylic acids, polyglycidyl esters which can be obtained by polymerization or copolymerization of glycidyl esters of unsaturated acids, or of other acid compounds (cyanuric acid and cyclic trimethylenetrisulfone or their derivatives, etc.).

In addition to the epoxy compounds with 2 and more epoxy groups cited by way of examples, mixtures of the same with monoepoxies can be used for the manufacture of the flame-resistant compounds. For example, the monoepoxies of the following types of compounds can be used: mono-unsaturated hydrocarbons (ethylene, propylene, butylene, cyclohexene, styrene), halogenous epoxies (epichlorhydrin), epoxy ethers of univalent alcohols (methyl, ethyl, butyl, 2-methylhexyl and dodecyl alcohol, etc.), epoxy ethers of univalent phenols (phenol, cresol and other phenols substituted in the ortho or para position), glycidyl esters of unsaturated carboxylic acids, epoxidized esters of unsaturated alcohols or unsaturated carboxylic acids, and the acetals of glycidaldehyde.

Similarly, the main chloro-substituted phosphorin could be replaced by a 2-substituted phosphorin to result in a phosphorinic acid derivative of a bromo-substituted phosphorin—e.g., 2-bromophosphorin. Further, 2-chloro- or bromo-substituted phosphorin can have many other substituents as, for instance, hydrogene, alkyl or alkoxy groups of varying size substituted on the benzo-substituent or it can be substituted with other fused phenyl ring on the benzo-substituent.

The preparation of the epoxide-anhydride adduct in the first stage of the process takes place suitably at as low a temperature as possible in order to prevent any premature reaction between the anhydride and the epoxy groups.

The reaction product formed in the first stage is substantially a 1:1 adduct of a halo phosphorus and an epoxide group.

It is, of course, to be understood that mixed reactants can be used in this invention, whereupon mixed products will be made.

The first stage epoxy halo-phosphorin adducts in accordance with the invention are readily soluble in many organic solvents, e.g., triethyleneglycol, and have stable viscosities. Further, reaction through the anhydride group of the phosphorin portion of the adduct with epoxy resins takes place at relatively high temperatures 80–200° C. and preferably about 100–150° C., to produce the hardened flame-retardant epoxy resin molded articles and coatings.

The hardening reaction suitably takes advantages of accelerators such as phenols: particularly, dialkyl-aminoalkyl phenols (4-(dimethylaminomethyl)-phenol, 2,4,6-tris-(dimethylaminomethyl)-phenol), Lewis acids, ($ZnCl_2$, $SnCl_4$, $BF_3$, $BF_3$ complex compounds and such), phosphines, arsines, stibines and others generally known epoxy resin hardening accelerators.

If such additional hardeners are employed, it has been found desirable to mix the phosphorin adduct with the additional hardener at moderate temperatures and thereafter to heat the mixture to above 80° C. to carry out the hardening reaction. Additional hardeners are carbonic-acid anhydrides and polyols.

The carbonic acid anhydrides suitable for use in the invention include cyclic acid anhydrides of aliphatic, aromatic, and heterocyclic carboxylic acids. In addition, the products conventionally used as hardening anhydrides, such as for instance, maleic, or succinic acid anhydride, 2-dodecenylsuccinic acid anhydride, phthalic acid anhydride, tetra- and hexahydrophthalic acid anhydride, trimellithic and pyromellithic acid anhydride, itaconic acid anhydride, hexachloroendomethylenetetrahydrophthalic acid anhydride as well as their substitution products and the diene addition products of unsaturated acids and dienes are particularly well suited for use in the reaction with the epoxy compounds especially in the reaction with polyepoxides as carried out in accordance with the invention.

Suitable polyols are ethylene glycol, propylene glycol, butylene glycol, hexanediols, higher glycols which can be obtained, for example, by the hydrogenation of dicarboxylic acids; xylene glycol, hexahydroxylene glycol, 1,4-cyclohexanediol, glycerol, diglycerol, triglycerol, and higher polyglycerol, methyl glycerol, trimethylolethane, trimethylolpropane, pentaerythritol, dipentaerythritol, pentitols, hexitols, and mono-, di and polysaccharides, which may be partially etherified or esterified. Polyglycols which are produced, for example, by the polymerization or copolymerization of olefin oxides and which can include both low-molecular products, such as diethylene glycol, triethylene glycol, and the like, as well as higher molecular products are also included in this group.

Additionally polyvinyl alcohol, partially acylated polyvinyl alcohol and polyallyl alcohol, as well as the copolymers of allyl alcohol with other unsaturated compounds or partially or completely saponified polymers of vinylidene carbonate can be employed in the reaction with epoxides in accordance with the invention.

If desired, the hardened epoxy resin product can be treated at about 30–50° C. above the hardening temperature for "after-hardening" it and thus improve its mechanical properties.

The following examples serve to illustrate the invention but are in nowise to be construed as limitative thereof:

Example 1

270 g. 2-chloro-4-oxo-5,6-benzo-1,3,2-dioxaphosphorin which had previously been brought to 40° C. were added dropwise, while stirring, at room temperature (22° C.) within two hours to 1000 g. of a diglycidyl ether of 2,2-bis-(4-hydroxyphenyl)-propane having an epoxide value of 0.53/100 g. resin. Reaction set in immediately with a strong development of heat. The reaction temperature was maintained at 40° C. by cooling during the dropwise reaction and stirring was continued at the same temperature for 2 hours. After completion of the reaction, ionogenic chlorine could no longer be detected by means of hydrolysis. A liquid epoxide-anhydride adduct, soluble in organic solvents and stable in its viscosity was obtained. 200 g. of this epoxide-anhydride adduct were dissolved in 1 g. triethylene glycol in the presence of 0.5 g. ZnCl$_2$ and hardened at 150° C. for 60 minutes to form a solid synthetic resin varnish. The product has a Vicat value of 105° C. and exhibited flame-resistant properties.

Examples 2–6

An epoxide anhydride adduct was prepared according to Example 1 from 1000 g. of diglycidyl ether of 2,2-bis-(4-hydroxyphenyl)-propane with an epoxide content of 0.53/100 g. of resin and 135 g. of 2-chloro-4-oxo-5,6-benzo-1,3,2-dioxaphosphorin, and the following hardening runs were carried out with it under the hardening conditions described.

The following table shows the values obtained for the mechanical properties which were determined on test articles as prepared above. Hardening was carried out at 130° C. and accelerated with 0.5 wt. percent of ZnCl$_2$.

Example 7

292 g. of 2-chloro-2,4-dioxo-5,6-benzo-1,3,2-dioxaphosphorin, dissolved in 400 g. of benzene, were added dropwise, while stirring, at room temperature (22° C.) within two hours to 1000 g. of a diglycidyl ether of 2,2-bis-(4-hydroxyphenyl)-propane having an epoxide value of 0.53/100 g. resin. The reaction temperature was maintained here under 40° C. and stirring was hereafter continued for 2 hours. After removing the benzene in vacuum, a viscous epoxide-anhydride adduct was obtained.

200 g. of this epoxide-anhydride adduct were, in the presence of 0.5 g. ZnCl$_2$, dissolved in 1 g. of triethylene glycol, and hardened at 150° C. in 60 minutes to form a solid synthetic resin block which showed flame-resistant properties.

Example 8

The use of an equivalent amount of 2-bromo-4-oxo-5,6-benzo-1,3,2-dioxaphosphorin under the same conditions as described in Example 1 gave a solid synthetic resin varnish with similar properties.

Example 9

The use of an equivalent amount of a diglycidyl ether of 1,4-butanediol with an epoxy value of 0.76 per 100 grs. of epoxy compound gave under the conditions described in Example 7 a shaped body with similar properties.

Example 10

The use of an equivalent amount of resorcinol diglycidylether with an epoxy value of 0.76 per 100 grs. of epoxy compound gave under the conditions described in Example 7 a shaped body with similar properties.

Example 11

The use of an equivalent amount of 4-vinylcyclohexenedioxide gave under the conditions described in Example 7 a shaped body with similar properties.

We claim:

1. The process of production of molded articles and coatings by hardening flame retardant resins which comprises reacting an epoxy compound having at least 2 1,2-epoxy groups per molecule with a mixed ester anhydride of an aromatic ortho-hydroxy carboxylic acid of the formula

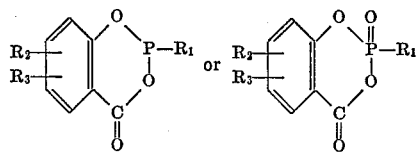

or mixtures of such wherein R$_1$ is chlorine or bromine, R$_2$ and R$_3$ is each hydrogen, alkyl, alkoxy, halogene or a condensed ring at a temperature of from 0 up to 80° C. and thereafter hardening the resin thus produced by heating the same to a temperature of from 80–200° C.

2. Process according to claim 1 wherein said mixed ester anhydride of an aromatic ortho-hydroxy carboxylic acid is used in a molar ratio to said epoxy compound of 1 to greater than 1, preferably 1 to 2.

3. Process according to claim 2 wherein said hardening is carried out at a temperature of from 100–150° C.

4. Process according to claim 2 wherein said mixed ester anhydride is 2-chloro-2,4-dioxo-5,6-benzo-1,3,2-dioxaphosphorin.

| Example | Epoxide-anhydride adduct (g.) | Additional hardener (g.) | Hardening duration (min.) | Tensile strength (kg./cm.²) | Bending strength (kg./cm.²) | Impact resistance (cm. kg./cm.²) | Hardness (kg./cm.²) | Vicat temp. °C. |
|---|---|---|---|---|---|---|---|---|
| 2 | 200 |  | 40 | 562 | 1,292 | 10.2 | 1224/1179 | 116 |
| 3 | 200 | 1,1,1-trimethylolpropane (15) | 65 | 417 | 936 | 6.4 | 1273/1224 | 105 |
| 4 | 200 | 2,2-dimethylolbutanol-3 (15) | 60 | 423 | 950 | 7.2 | 1178/1152 | 98 |
| 5 | 200 | Hexahydrophthalic acid anhydride (35) | 35 | 430 | 1,038 | 12.0 | 1370/1315 | 135 |
| 6 | 200 | Chlorophthalic acid anhydride (45) | 40 | 416 | 1,115 | 11.5 | 1384/1326 | 170 |

5. Process according to claim 2 wherein said mixed ester anhydride is 2-chloro-4-oxo-5,6-benzo-1,3,2-dioxaphosphorin.

6. Process according to claim 2 wherein said mixed ester anhydride is 2-bromo-2,4-dioxo-5,6-benzo-1,3,2-dioxaphosphorin.

7. Process according to claim 2 wherein said mixed ester anhydride is 2-bromo-4-oxo-5,6-benzo-1,3,2-dioxaphosphorin.

8. Process according to claim 2 wherein the epoxy compound is a polyglycidyl ether of a polyvalent phenolic compound.

9. Process according to claim 8 wherein the epoxy compound is a diglycidyl ether of 2,2-bis-(4-hydroxyphenyl)-propane.

10. Process according to claim 8 wherein the epoxy compound is a diglycidyl ether of resorcinol.

11. Process according to claim 8 wherein the epoxy compound is a diglycidyl ether of hydroquinone.

12. Process according to claim 2 wherein said mixed ester anhydride is 2-chloro-4-oxo-5,6-benzo-1,3,2-dioxaphosphorin and said epoxy compound is a diglycidyl ether of 2,2-bis-(4-hydroxyphenyl)-propane.

13. Process according to claim 2 wherein said hardening is effetced in the presence of an accelerator.

14. Process according to claim 13 wherein said accelerator is a Lewis acid.

15. Process according to claim 14 wherein said Lewis acid is $ZnCl_2$.

16. Process according to claim 2 wherein said hardening is effected in the presence of a polycarboxylic acid anhydride as a hardening agent.

17. Process according to claim 2 wherein said hardening is effected in the presence of a polyol as a hardening agent.

18. Process according to claim 17 wherein said polyol is 1,1,1-trimethylol-propane.

19. Process according to claim 17 wherein said polyol is 2,2-dimethylol-butanol-3.

20. Process according to claim 16 wherein the polycarboxylic acid anhydride is hexahydrophthalic acid anhydride.

21. Process according to claim 16 wherein the polycarboxylic anhydride is chlorophthalic acid anhydride.

References Cited

UNITED STATES PATENTS 3,245,940  4/1966  Ronay et al. _____ 260—47

WILLIAM H. SHORT, *Primary Examiner.*

T. D. KERWIN, *Assistant Examiner.*